US009268340B2

(12) United States Patent
Womack et al.

(10) Patent No.: US 9,268,340 B2
(45) Date of Patent: *Feb. 23, 2016

(54) FLOW BALANCING IN GAS DISTRIBUTION NETWORKS

(71) Applicant: Novellus Systems, Inc., Fremont, CA (US)

(72) Inventors: Jeffrey Womack, Lake Oswego, OR (US); Stephen Lau, Lake Oswego, OR (US)

(73) Assignee: Novellus Systems, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,851

(22) Filed: Nov. 25, 2014

(65) Prior Publication Data
US 2015/0075626 A1 Mar. 19, 2015

Related U.S. Application Data

(63) Continuation of application No. 13/667,282, filed on Nov. 2, 2012, now Pat. No. 8,925,588.

(60) Provisional application No. 61/684,261, filed on Aug. 17, 2012.

(51) Int. Cl.
F16K 11/20 (2006.01)
G05D 16/02 (2006.01)
F17D 3/00 (2006.01)

(52) U.S. Cl.
CPC ...... G05D 16/02 (2013.01); F17D 3/00 (2013.01); Y10T 137/0318 (2015.04); Y10T 137/0363 (2015.04); Y10T 137/2521 (2015.04); Y10T 137/877 (2015.04); Y10T 137/87877 (2015.04)

(58) Field of Classification Search
CPC ................................. F16K 11/20; F17D 3/00

USPC ................................. 137/883, 884; 118/715
See application file for complete search history.

(56) References Cited

U.S. PATENT DOCUMENTS 5,307,568 A 5/1994 Matsuo et al.
6,210,482 B1 4/2001 Kitayama et al.
(Continued)

FOREIGN PATENT DOCUMENTS

CN 1468441 A 1/2004
WO WO02095519 A1 11/2002

OTHER PUBLICATIONS

US Notice of Allowance dated Sep. 3, 2014 issued in U.S. Appl. No. 13/667,282.
(Continued)

Primary Examiner — John Fox
(74) Attorney, Agent, or Firm — Weaver Austin Villeneuve & Sampson LLP

(57) ABSTRACT

Flow distribution networks that supply process gas to two or more stations in a multi-station deposition chamber. Each flow distribution network includes an inlet and flow distribution lines for carrying process gas to the stations. The flow distribution lines include a branch point downstream from the inlet and two or more branches downstream from the branch point. Each branch supplies a station. The flow distribution network also includes highly variable flow elements in each branch. Restrictive components are placed downstream from the variable control elements in each branch. These restrictive components are nominally identical and designed to shift the bulk of the pressure drop away from the variable flow components to improve flow balancing while not unduly increasing inlet pressure. In some cases, the load shifting allows the more variable flow components to operate in the unchoked flow regime.

35 Claims, 15 Drawing Sheets

(56) References Cited

U.S. PATENT DOCUMENTS

| | | |
|---|---|---|
| 7,424,894 B2 | 9/2008 | Lull et al. |
| 8,088,248 B2 | 1/2012 | Larson |
| 8,790,529 B2 | 7/2014 | Hayasaka et al. |
| 2001/0013363 A1 | 8/2001 | Kitayama et al. |
| 2002/0042205 A1 | 4/2002 | McMillin et al. |
| 2011/0236594 A1 | 9/2011 | Haverkamp et al. |
| 2011/0265951 A1 | 11/2011 | Xu et al. |
| 2014/0048141 A1 | 2/2014 | Womack et al. |

OTHER PUBLICATIONS

"Diaphragm Valves", Parker Hannifin Corporation (Oct. 2003), *Microelectronics Product Line*, Catalog 4505/USA, pp. 1-49.

Chinese Office Action dated Jun. 2, 2015 in CN Application No. 201310361997.9.

BASELINE $R_1 = 5;\ R_2 = 5.5 \rightarrow R_1/R_2 = 0.91$

Error $R_{2A} = 10\%$ → Error in $R_1/R_2 = 9\%$

BALLASTED $R_1 = 55;\ R_2 = 56.0 \rightarrow R_1/R_2 = 0.982$

Error $R_{2A} = 10\%$ → Error in $R_1/R_2 = 1.8\%$

FLOW BALANCING IN GAS DISTRIBUTION NETWORKS

CROSS REFERENCE TO RELATED APPLICATION

This is a continuation application of and claims priority to U.S. patent application Ser. No. 13/667,282 (now U.S. Pat. No. 8,925,588), filed on Nov. 2, 2012 and titled "FLOW BALANCING IN GAS DISTRIBUTION NETWORKS," which claims priority to and benefit of U.S. Provisional Patent Application No. 61/684,261, titled "FLOW BALANCING IN GAS DISTRIBUTION NETWORKS and filed on Aug. 17, 2012; both of which are hereby incorporated by reference in their entirety and for all purposes.

BACKGROUND

Existing flow distribution networks rely on symmetry, large components and close tolerances to distribute flows evenly to the branches. While this may be adequate for liquids or high pressure gases, the velocities experienced by low pressure compressible fluids amplify minor variations in fluidic elements, unbalancing the flows. This problem is particularly severe with complex geometries such as those found in shutoff valves.

Process sequences that alter gas flows with the plasma on, such as the one described in U.S. patent application Ser. No. 12/970,846 filed on Dec. 16, 2010 (hereby incorporated by reference in its entirety), generally require valves to be located as close to the process stations (e.g., chambers) as possible. This, in turn, requires the shutoff valves to be placed in each branch of the network, which can create a flow imbalance. Other applications, particularly those applications involving simultaneous gas flow to multiple stations in a reactor or multiple reactors, can also suffer flow imbalances to the individual stations or reactors.

Balancing flow rates using conventional technology requires symmetry across the branches, which may not be possible or desirable in some applications. For example, symmetry may preclude the use of highly variable fluidic elements such as conventional shutoff valves. Fabricating these fluidic elements to very low tolerances to maintain symmetry across the branches may be prohibitively expensive. Alternatively, using large components to balance flow requires a significant pressure drop in the system, which can increase cost and limit the maximum flow.

SUMMARY

Provided are techniques that balance flow of compressible fluids delivered to multiple stations in low pressure flow distribution networks. To balance flows, flow restrictors are introduced at the ends of multiple branches of distribution lines near outlets to the stations. The flow restrictors are nominally identical and designed to shift the bulk of the pressure load away from relatively high variable fluidic elements located upstream in the branches to the less variable downstream restrictors while not unduly increasing inlet pressure. Shifting the pressure load to the less variable restrictors may allow the more variable fluidic elements to operate in an unchoked flow regime and can improve flow balancing. These techniques help compensate for the unbalancing effect of highly variable fluidic elements and other asymmetry across the branches and do not require the use of large fluidic components.

In embodiments, a flow distribution network supplies a process gas to two or more stations in a multi-station deposition chamber. The flow distribution network includes at least one inlet for receiving a process gas and a network of flow distribution lines for carrying the gas. The network of flow distribution lines comprises a branch point downstream from the inlet and two or more branches downstream from the branch point. Each branch has an outlet for supplying process gas to a corresponding station. The flow distribution network also includes a variable flow element (e.g., a shutoff valve) having a flow coefficient $C_v$ value that varies by at least about 2% from element to element across the branches. A restrictive component is located downstream from the variable control element in each branch. The restrictive component may be, for example, a constriction in an associated flow distribution line downstream of the variable control element. The restrictive components are nominally identical. The flow of the process gas produces a system pressure drop, from the inlet to the outlets, across the flow distribution network that is at least as great as the pressure at the outlets. In some cases, the variable flow elements of the flow distribution network may operate in the unchoked flow regime.

The variable flow elements of the flow distribution network produce, on average, a first portion of the system pressure drop in the flow distribution network. The restrictive components produce, on average, a second portion of the pressure drop in the flow distribution network. In some cases, the ratio of the second portion to the first portion may be between about 5:1 to about 20:1.

In some cases, the flow distribution network may further include a controller for controlling the system pressure drop. The controller may be in communication with the inlet, one or more outlets and/or other components of the network.

In an aspect of the embodiments, the restrictive components may produce a certain system pressure drop on average across the restrictive components in the branches. For example, the restrictive components may produce at least about 3% of the system pressure drop on average across the restrictive components. In another example, the restrictive components may produce at least about 50% of the system pressure drop on average across the restrictive components. In yet another example, the restrictive components may produce between 10% and 80% of the system pressure drop on average across the restrictive components.

In another aspect, the variable flow elements may produce a certain system pressure drop on average across the elements in the branches. For example, the variable flow elements may produce at most about 5% of the total pressure drop in the flow distribution network on average across the variable flow elements. In another example, the variable flow elements may produce at most about 10% of the total pressure drop in the flow distribution network on average across the variable flow elements.

In yet another aspect, a flow distribution network may have variable flow elements that produce a mass flow rate that varies by, for example, at least about 2%, on average, from element to element across the branches when each element experiences substantially the same pressure drop. In another example, the mass flow rate at the variable flow elements may vary by at least 5% or 10%.

In another aspect, a flow distribution network may have restrictive components in the branches that have flow coefficient Cv values that vary on average across the branches by less than a certain percentage. For example, the restrictive components may vary on average by 1% or less from component to component across the branches. As another example, the restrictive components may vary on average by 4% or less from component to component across the branches.

In another aspect, the restrictive components may provide process gas at a nominally uniform mass flow rate to respective outlets supplying stations. The nominally uniform mass flow rate may vary, for example, by less than about 1% between outlets in some cases. In another example, the nominally uniform mass flow rate may vary by less than about 2% between outlets.

These and other aspects are described further below with reference to the drawings.

DETAILED DESCRIPTION

Figure 1A:
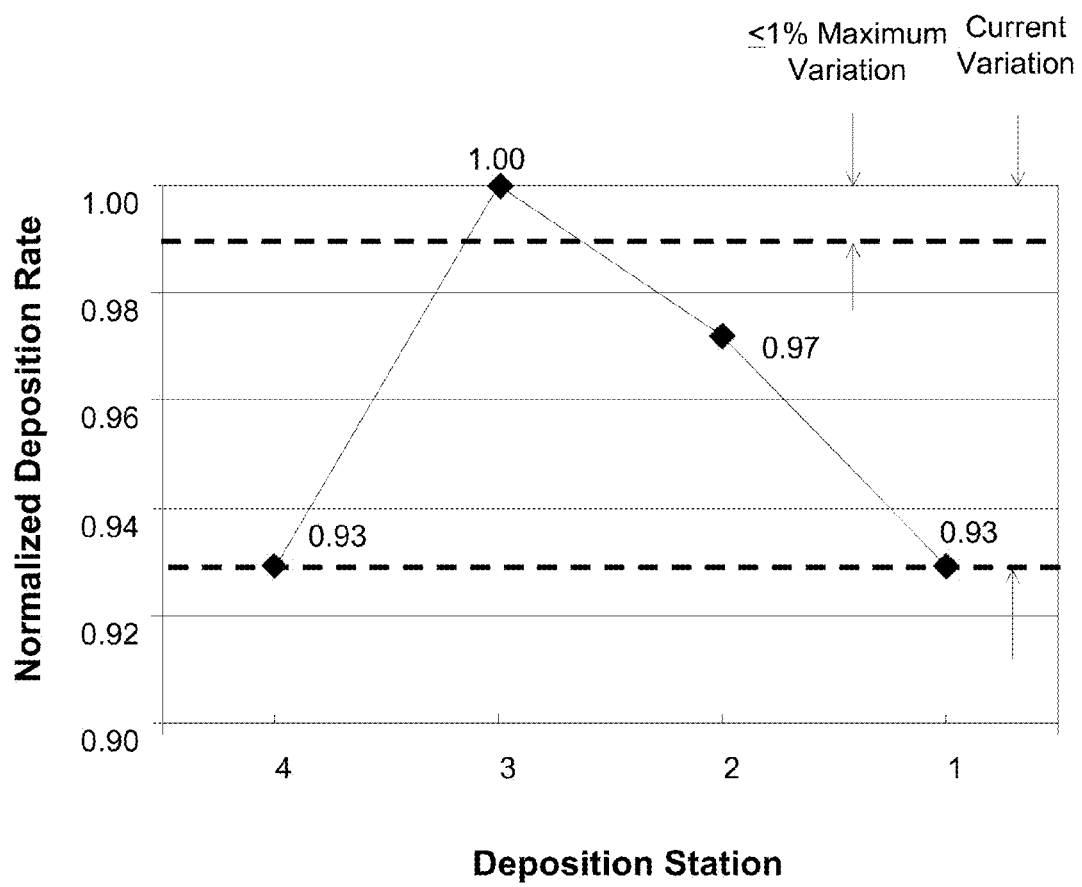
FIG. 1A is a graph of the normalized deposition rate for four deposition stations in a multi-station flow distribution network, according to embodiments.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

Flow Distribution Network with Flow Balancing

In embodiments, flow restrictive components (restrictors) are disposed in each of multiple branches of distribution lines in flow distribution networks. These flow restrictive components are nominally identical. Such networks include one or more inlets for receiving gas from a supply source(s). These networks also include at least one branch point downstream from the inlets and two or more branches downstream from the branch point. The gas from the inlet(s) is divided into the branches on its way to two or more outlets. Each branch supplies the gas to a separate station through an associated outlet. Some embodiments presented herein employ four stations, each supplied with process gas by a flow distribution network. Other embodiments presented herein employ two stations. Generally, embodiments of flow distribution networks may include two or more stations.

The stations of flow distribution networks of embodiments may be, for example, chambers (e.g., reaction chambers) or portions of chambers where one or more of the following processes may take place: chemical vapor deposition, atomic layer deposition, conformal film deposition, plasma enhanced chemical vapor deposition, and the like. In some cases, the stations of a flow distribution network may be in a multi-station deposition reactor. Each of these stations may be a reaction chamber outfitted with a showerhead, which receives process gas from an outlet of the flow distribution network and provides process gas to the interior of the station.

A multi-station reactor allows one to run the same or different processes concurrently in one chamber environment, thereby increasing the efficiency of work piece processing. In general, any number of stations may be possible within the single chamber. The stations may have the same or different functions. In one case, individual stations can operate under distinct process conditions and may be substantially isolated from each other. For example, one station may operate under one temperature regime, while another may operate under a different temperature regime. Some operations may require a different temperature regime (e.g., a higher temperature), and may be carried out in a different station or stations. In accordance with certain embodiments, each process chamber operates under identical conditions or under conditions which allow precisely the same thickness of silicon oxide, silicon nitride or other material to be deposited in each station concurrently.

The process conditions at the multiple stations and the process flow itself can be controlled by a controller which comprises program instructions for a monitoring, maintaining and/or adjusting certain process variables, flow rates and times, temperature, inlet pressure, outlet(s) pressure, and the like. The instructions may specify some or all of the parameters to perform operations of the processes. The controller may comprise different or identical instructions for different apparatus stations, thus allowing the stations to operate either independently or synchronously.

The controller will typically include one or more memory devices and one or more processors. The processor may include a central processing unit (CPU) or computer, analog and/or digital input/output connections, stepper motor controller boards, and other like components. Instructions for implementing appropriate control operations are executed on the processor. These instructions may be stored on the memory devices associated with the controller or they may be provided over a network. Typically, there is a user interface associated with the system controller. The user interface may include a display screen, graphical software to display process conditions, and user input devices such as pointing devices, keyboards, touch screens, microphones, and other like components.

The computer program code for controlling the operations of the different processes can be written in any conventional computer readable programming language: for example, assembly language, C, C++, Pascal, Fortran, or others. Compiled object code or script is executed by the processor to perform the tasks identified in the program.

Signals for monitoring the process may be provided by analog and/or digital input connections of the system controller. The signals for controlling the process are output on the analog and digital output connections of the processing system.

In embodiments, the flow distribution networks are designed or configured to deliver a compressible fluid, such as a process gas, to one or more stations. Precursor gases may be the process gas used in many applications of embodiments. The process gas may be delivered to the stations through a flow distribution network at a wide range of pressures including, for example, outlet pressures above atmospheric, at atmospheric, sub-atmospheric, and near vacuum. In some cases, the network inlet gas pressure ($P_{inlet}$) may be between 50 and 1000 torr. Typically, the total pressure drop over the network ($\Delta P_{system}$), from inlet to the outlets, in the flow distribution network, is relatively large in comparison to the absolute pressure to the stations ($P_{outlet}$) to which the gas is delivered. That is, the ratio $\Delta P_{system}/P_{outlet}$ is greater than 1. In some implementations, the ratio $\Delta P_{system}/P_{outlet}$ is between 1 and 20. Unless otherwise stated, it should be assumed that the embodiments and features described herein employ: (1) a flow distribution network with branches to multiple outlets, (2) for delivering a compressible fluid to these multiple outlets, and (3) over which the total pressure drop of such compressible fluid is large by comparison to the outlet pressure.

In certain disclosed embodiments, a precise restrictive component (such as an orifice or tube machined to close tolerances) is added at each of the ends of the branches in the flow distribution network. The precise restrictive components are at or near the outlets providing process gas at a low outlet pressure $P_{outlet}$ to the stations (e.g., 5 torr, 6 torr, 7 torr, etc.). Typically, the restrictive components are nominally identical having relatively low variation (e.g., 0.5% or less, 1% or less, 2% or less, 3% or less, 4% or less, etc.) of values in flow coefficients $C_v$ between the restrictive components across the branches. The restrictive components may be designed to match a typical pressure drop of the most restrictive branch, where the branches do not possess identical flow properties such as when the distribution network is asymmetric. By raising the pressure at points immediately upstream from the restrictive components (restrictors), the density of the gas in the branches is increased, reducing the velocity which, in turn, reduces the losses (i.e. pressure drop) in the upstream portions of the branches. Often these upstream portions contain highly variable fluidic elements such as certain types of valves. Reducing losses in these highly variable components reduces the variability of the flow from branch to branch, increasing station to station flow uniformity—a result that is particularly important for stacked films.

The designs and techniques disclosed herein for distributing low pressure gases may provide improved flow matching in each branch of a flow distribution network in spite of fluidic element variability (asymmetry) from branch to branch. Such designs and techniques also may shift some network pressure drop from highly variable fluidic elements (e.g., shutoff valves) to less variable fluidic elements ("load shifting"). Examples of less variable fluidic elements include restrictive components that can be easily and consistently produced to close tolerances such as, for example, orifices or machined tubes. These restrictive components can have lower variability in flow coefficient $C_v$ values that, when placed in each branch, can improve flow balancing.

Flow distribution networks can experience choked flow at highly variable fluidic elements. Adding restrictive components downstream from the highly variable fluidic elements can shift choked flow to the less variable restrictive components. It can be beneficial to shift choked flow to the less variable restrictive components from the more variable fluidic elements because there is a greater pressure drop associated with choked flow. Choked flow of compressible fluids through a fluidic element requires the pressure drop in the fluidic element to be a large percentage of the inlet pressure (e.g. 50%). By load shifting as described herein, the greater portion of the total pressure drop is shifted to the less variable restrictive components, which contribute relatively less variation to the flow rates.

In certain embodiments, the disclosed designs leverage the compressibility of the delivered gas to significantly improve flow balancing without significantly increasing overall pressure drop in the flow distribution network or without significantly increasing the pressure at one or more inlets of the flow distribution network. Other benefits of some implementations include: 1) allowing the use of highly variable flow elements upstream of the restrictive components since the relative pressure drop at the highly variable flow elements is dramatically reduced, 2) eliminating the need for symmetry in the network fluidic elements since the restrictive components (restrictors) can be sized to match the pressure drop in the most restrictive branch, which can significantly balance all the mass flow rates, 3) allowing the use of smaller network components since the velocity of the gas flow in the network will be reduced by the higher pressure, and/or 4) being able to exploit the significant effect of changing the pressure on low pressure gases to more efficiently solve balancing problems by employing "load shifting."

Figure 1B:
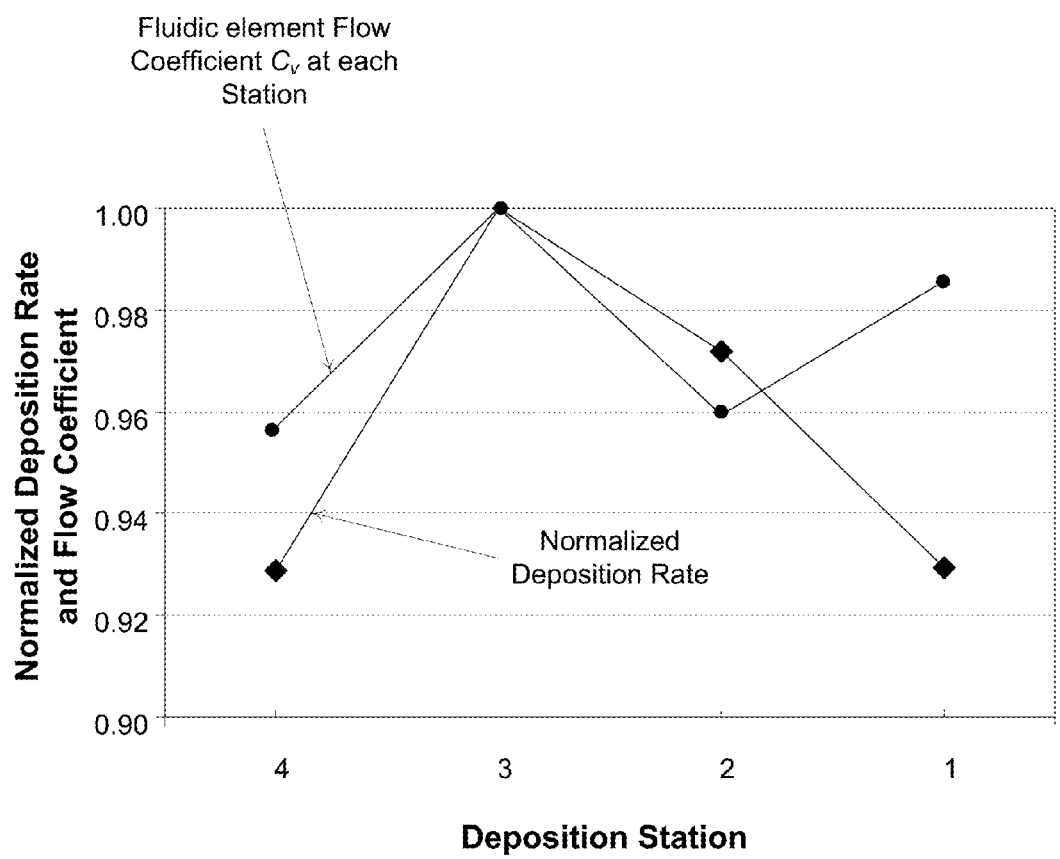
FIG. 1B is a graph of the normalized deposition rate and flow coefficient $C_v$ for four deposition stations in the multi-station flow distribution network of FIG. 1A.

FIG. 1A and FIG. 1B show observed results in a multi-station flow distribution network for delivering low pressure gas to four separate reaction stations where deposition of, for example, silicon oxide, silicon nitride, polysilicon, and/or other materials takes place. This flow distribution network can be used in fabrication of a vertically integrated memory (VIM) for example. The results were observed without less variable restrictive components described herein introduced at the ends of the branches.

In FIG. 1A, the normalized deposition rate (i.e. deposition rate at particular station/highest deposition rate at the stations) is plotted for the four deposition stations in the flow distribution network. In many applications, it is desired that the deposition rate vary from the highest rate by less than about a maximum variation across multiple stations. In the illustrated application, it is desired that the deposition rate vary by less than about 1% maximum allowable variation across the four deposition stations. In FIG. 1A, significantly higher variations of 3% at station 2 and 7% at stations 1 and 4 are observed in the network under observation. The source of the observed variation in deposition rates may be due to variations in reactant concentration, variations in radio frequency power (in the case of a plasma-assisted deposition reaction), and variations in mass flow rate of precursor or other process gas delivered to the individual stations or chambers of the system. In the context of this disclosure, variations in the mass flow rate are the variations that will be addressed.

It should be understood that the variations in "gas flow rate" or "flow rate" or flow" addressed herein are variations in the mass flow rate of the process gas. Since the deposition rate is a function of the mass flow rate, variations in the mass flow rate of the process gas directly impact the deposition rate.

The impact of mass flow rate on deposition rate is reflected in the graph shown in FIG. 1B. More specifically, the graph in FIG. 1B shows that the normalized deposition rate at the four stations corresponds and is some measure of the flow coefficient $C_v$ value of the fluidic elements (e.g., valves) controlling gas flow to the stations. The parameter $C_v$ relates the mass flow rate to the pressure drop in a particular fluidic element such as a valve. For a fixed pressure drop across a fluidic element, a higher value of $C_v$ corresponds to a higher mass flow rate. Of course, a higher mass flow rate also corresponds to a higher deposition rate in a station receiving the gas flow.

Techniques and designs of embodiments may provide a nominally uniform mass flow rate of process gas to stations of a flow distribution network. In embodiments, the nominally uniform mass flow rate varies by less than a small percentage (e.g., 1%, 2%, 0.5%, etc.) from station to station. A nominally uniform mass flow rate across the stations can correspond to a nominally uniform deposition rate across the stations. An application that can profit from such techniques and designs of embodiments is fabrication of a VIM employing stacked layers of dielectrics. Stacks may include, for example, alternating layers of oxide and nitride and/or alternating layers of oxide and polysilicon. It is imperative that in applications such as VIM that the thicknesses of the individual layers are well controlled and consistent from station to station. Of course, the techniques and apparatus disclosed herein are not limited to VIM applications. Many other applications associated with integrated circuit manufacturer, LED manufacturer, photovoltaic manufacturer, and the like may profit from the techniques and apparatus disclosed herein.

Figure 2A:
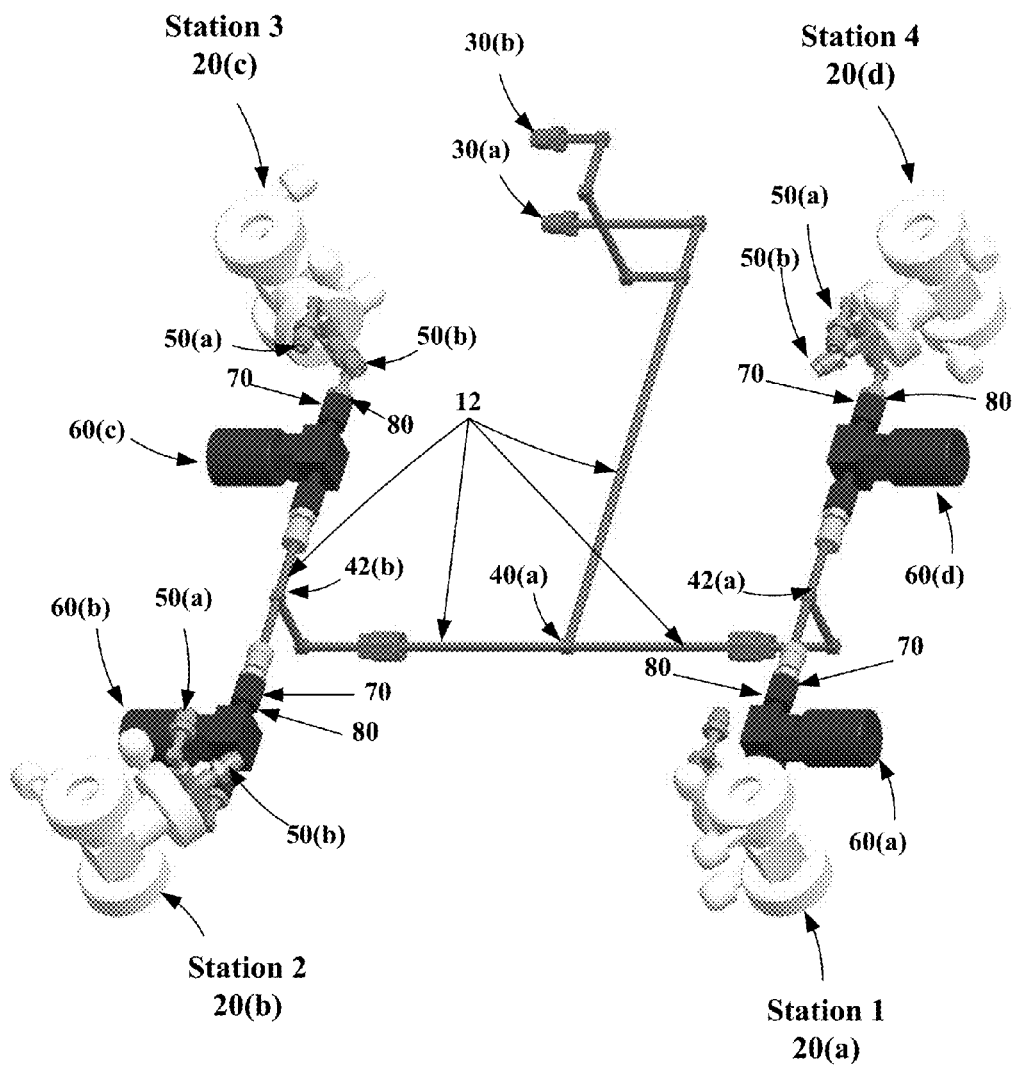
FIG. 2A is a schematic diagram of components of a flow distribution network with four stations, in accordance with certain embodiments described herein.

FIG. 2A is a schematic diagram depicting a configuration of a flow distribution network 10, in accordance with certain embodiments described herein. In the illustrated configuration, the flow distribution network 10 is a multi-station deposition reactor. The flow distribution network 10 includes a network of flow distribution lines 12 that deliver a process gas to four stations 20, which include station 1—20(a), station 2—20(b), station 3—20(c), and station 4—20(d). In this illustration, the stations 20 are deposition stations in a reactor chamber. Each of the stations 20 includes a showerhead which receives process gas and provides the process gas to the interior of the station 20. In other cases, the stations 20 may include other components.

The process gas can be provided to the flow distribution network 10 through one or more of the two inlets 30(a) and 30(b) of respective manifolds. The depicted flow distribution network 10 has three branch points 40(a), 42(a), and 42(b) at T fittings (also designated herein as Ts or Tees) in the flow distribution lines 12. From the inlets 30(a) and 30(b) of manifolds 1 and 2, the gas encounters a first T fitting at a first branch point 40(a), which divides the gas flow into two portions, with one portion providing gas to station 2—20(b) and station 3—20(c) and the other portion providing gas to station 1—20(a) and station 4—20(d). Each of these lines has two secondary branch points 42(a) and 42(b) at T fittings downstream from the first branch point 40(a), which divide the gas flow into four separate branches to station 1—20(a), station 2—20(b), station 3—20(c), and station 4—20(d).

Additionally, as depicted in the diagram of flow distribution network 10 of FIG. 2A, each station 20 has two local inlets 50(a) and 50(b) providing gas directly to the associated station 20. In the illustrated example, the local inlet 50(a) is a manifold 3 inlet and local inlet 50(b) is a TEOS inlet. TEOS is a precursor sometimes used to form silicon oxides and related materials. In practice, these local inlets 50(a) and 50(b) can be employed to provide any of a number of different gases directly to the associated station 20.

Of interest in the depicted flow distribution network 10 are sources of variability in the mass flow rate and related deposition rates at different stations 10 of the separate branches. The primary source of variability described herein is in the design of fluidic elements (e.g., valves, restrictive components, distribution lines, etc.) which, under a given set of conditions, the mass flow rate varies from element to element having the same design or varies from time to time in a single element. In the case of valves and restrictive components, the asymmetry between elements having the same design is based on manufacturing tolerances and other fabrication variations. Where the source of variability is in the asymmetry of flow distribution lines from one branch to another, the asymmetry may be associated with asymmetric lengths of the distribution lines 12, obstructions (e.g., debris in the distribution line), fittings, and/or bends (e.g., an elbow).

Variability in fluidic elements is often manifested as a variation in the flow coefficient $C_v$ values between fluidic elements having the same design. As previously mentioned, the flow coefficient $C_v$ relates the mass flow rate to the pressure drop across a fluidic element. In illustrated embodiments, the primary source of variability in mass flow rates across the branches based on a variation in flow coefficient $C_v$ values between the variable flow elements 60 in the branches. Although the variable flow elements 60 are depicted in illustrated examples as valves, the variable flow elements may be other sources of variability or may be combinations of sources of variability across the branches in other embodiments.

An example of valve that may be a primary source of variability in a flow distribution network 10 is a shutoff valve (e.g., a Veriflo® ISO 9001 valve). The variability of the features of conventional shutoff valves can be about +−10%. The source of variability in conventional shutoff valves may be associated with the mechanical actuator that closes the valve as well as the deformability of the diaphragm or flow control mechanism in the valves.

In embodiments, flow coefficients $C_v$ of variable flow elements 60 in a flow distribution network 10 vary on average from element to element across the branches by at least about, for example, 1%, 2%, 5%, 10%, etc. For example, the flow coefficient $C_v$ of each variable flow element 60 may vary by at least about 2% from the nominal $C_v$ value calculated from all variable flow elements 60 in a flow distribution network 10.

In some cases, the coefficients $C_v$ of variable flow elements 60 in a flow distribution network 10 vary by at least about a minimum percentage variation (e.g., 2%, 5%, etc.) from element to element across the branches to correspond to a variation in mass flow rate or deposition rate at the stations that is more than a maximum allowable variation (e.g., 1%, 2%, etc.). For example, the flow coefficients $C_v$ values may need to vary by at least the minimum percentage variation of 2% to create a variation in deposition rates of more than 1% maximum allowable variation where the network does not yet contain precise restrictors. Since the deposition rates are above the maximum allowable variation, flow balancing by placing less variable fluidic elements downstream of the highly variable fluidic elements can be used to reduce the deposition rate variation to less than the maximum allowable variation.

Returning to FIG. 2A, flow distribution network 10 includes four restrictive components 70 downstream from variable flow elements 60(a), 60(b), 60(c), and 60(d). The restrictive components 70 are nominally identical having flow coefficients $C_v$ values that vary from component to component in the branches by a maximum variation (e.g., 0.5%, 1%, 2%, 3%, 4%, etc.) or less from the nominal $C_v$ value of all the restrictive components 70. The nominally identical restrictive components 70 have the same design features with dimensions (e.g., inner diameter) that can be fabricated within a tolerance of less than, for example, 0.5%, 1%, 2%, 3%, 4%, etc., in order to have no more than the maximum variation in flow coefficients $C_v$ values.

The process gas flow is provided to the stations through outlets 80 downstream from the restrictive components 70. In embodiments, the restrictive components 70 provide process gas to the respective outlets 80 supplying the stations 20 at a nominally uniform mass flow rate and/or a nominally uniform deposition rate. A nominally uniform rate varies by no more than a maximum allowable variation (e.g., 1%, 2%, etc.) from the nominal rate at all stations 20. For example, the restrictive components 70 in the branches may provide process gas at a mass flow rate that varies by less than about 1% between the outlets 80.

Figure 2B:
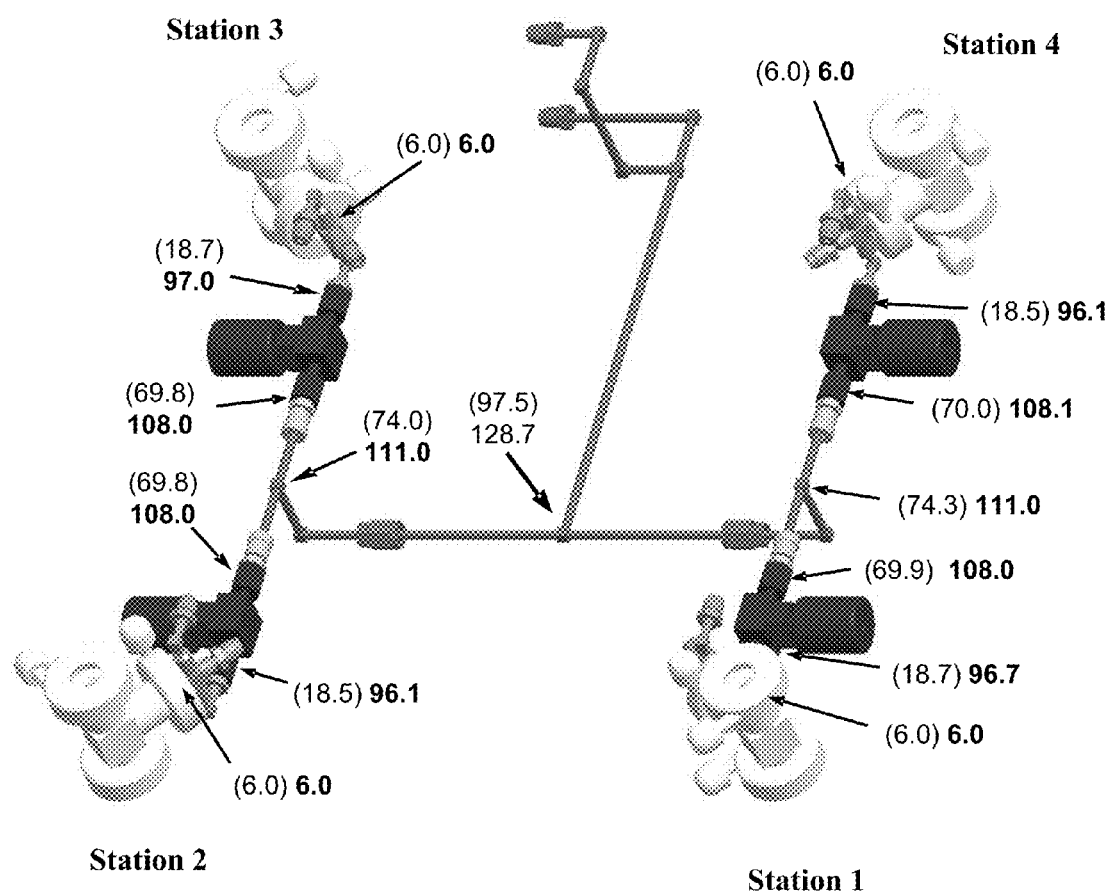
FIG. 2B is a schematic diagram of the components of the flow distribution network of FIG. 2A showing pressures at nodes in the network with and without restrictive component (restrictors).

FIG. 2B illustrates how pressure varies in the flow distribution network 10 of FIG. 2A when it contains restrictive components 70 as described and when it does not contain the restrictive components 70. Pressure values calculated for both networks 10 are presented at various nodes in the illustration. The node pressures in parentheses are pressures when the network 10 does not include restrictive components 70. The node pressures outside the parentheses are pressures when it does include restrictive components 70. The illustrated pressures in the network 10 when it includes restrictive components 70 show the load (pressure drop) shifted from the variable flow elements 60 to the restrictive components 70. Importantly, in the illustrated design with the restrictive components 70 (restrictors), the contribution of the pressure drop in the variable flow elements 60 to the total pressure drop $\Delta P_{system}$ in the network 10 was reduced from 56% to 9%. This pressure drop $\Delta P_{system}$ is further illustrated with reference to the graph presented in FIG. 2C.

In embodiments, the variable flow elements 60 contribute, on average, at most about a maximum valve contribution (e.g., 5%, 10%, 15%, 20%, etc.) to the total pressure drop $\Delta P_{system}$ in the flow distribution network 10 containing restrictive components 70. For example, the variable flow elements 60 may contribute on average across the branches at most about 20% of the total pressure drop $\Delta P_{system}$ in the network 10. As another example, the variable flow elements 60 may contribute on average across the branches at most about 10% of the total pressure drop $\Delta P_{system}$ in the network 10. In yet another example, the variable flow elements 60 may contribute on average across the branches at most about 5% of the total pressure drop $\Delta P_{system}$ in the network 10.

In embodiments, the restrictive components 70 contribute on average at least about a minimum contribution of, for example, 3%, 5%, 10%, 25%, 50%, 60%, or 70%, to the total pressure drop $\Delta P_{system}$. In one embodiment, the restrictive components 70 contribute, on average, at least about 3%. In another embodiment, the restrictive components 70 contribute, on average, at least about 50%. In yet another embodiment, the restrictive components 70 contribute, on average, between 10% and 80%.

The pressure values shown in FIG. 2B were calculated using a Mathcad® model. The Mathcad® model included the portion of the flow distribution network 10 from the first branch point 40(a) to the outlets 80 (e.g., showerhead manifold) at the four stations 20. The gas used was a mixture of 12 slm of $N_2O$, 5 slm of $N_2$ and 4 slm of He. The $\rho$, $\mu$, Cp and k used in the model were based on the properties of the mixture. The Darcy-Weisbach equation was used for tubes and the Colebrook equation for friction factors. The equivalent length method was used for the fittings (e.g., elbows, tees) in the flow distribution lines 12. The Swagelok® MS-06-84 valve was used in to model as the variable flow element 60. All methods assume fully developed flow. The $C_v$ was calculated from measurements (0.301-0.314). The outlet pressure $P_{outlet}$ was 6 torr and the Temperature was 25 C throughout.

Figure 2C:
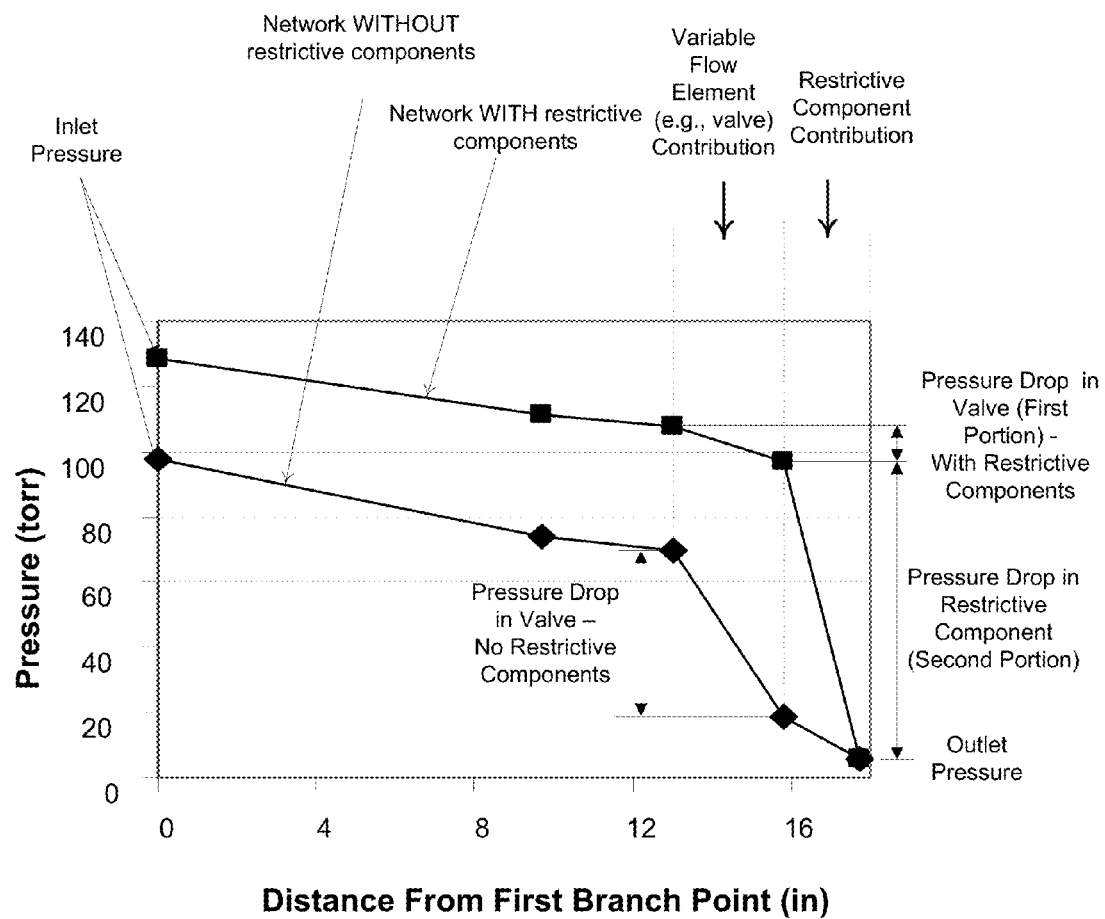
FIG. 2C is a graph plotting pressure drops at different distances along a branch of the flow distribution network of FIG. 2A and FIG. 2B.

FIG. 2C is a graph of the pressures calculated at various nodes of the flow distribution network 10 of FIGS. 2A and 2B as a function of distance from the inlet. The graph in FIG. 2C includes a first curve that shows how the pressure varies within the flow distribution network 10 containing the restrictive components 70 as described. The graph also includes a second curve that shows how the pressure varies within the flow distribution network 10 when it does not contain the restrictive components 70. The outlet pressure at the furthest distance from the first branch point is 6 Torr in both cases. In embodiments, the outlet pressure $P_{outlet}$ may be maintained at a low pressure by having a pumping speed at the outlet manifold that greatly exceeds the flow for the process.

In the flow distribution network 10 that does not contain restrictive components 70, the inlet pressure is 97.5 Torr. Of particular interest, the pressure drops from ~70 Torr to ~18.7 Torr over the valves in each of the four branches of the distribution network 10 that does not contain restrictive components 70. The inlet pressures, pressure drops and outlet pressure vary slightly in each of the branches (legs). As mentioned above, the valves are the primary source of flow rate variability in the described flow distribution network 10. Also as noted above, about 56% of the total pressure drop in the flow distribution network 10 without restrictive components 70 occurs in flow through these valves. As a consequence, the variability in these valves is directly translated to variability in the mass flow rate of the gas is delivered to each of the stations 20. And of course the variability of mass flow rate corresponds to variability in deposition rate.

In the flow distribution network 10 that does contain restrictive components 70, the inlet pressure is 128.7 Torr. In this case, the pressure drops from ~108 Torr to ~97 Torr over the valves and the pressure drops from the ~97 Torr to 6 Torr at the outlets downstream from the restrictive components 70. In this case, the pressure drop has been shifted to the restrictive components 70. Importantly, in the design with the restrictive components 70, the contribution of the valves to the total pressure drop in the flow distribution network 10 was reduced from 56% to 9%. Also, the inlet pressure increases from 97.5 Torr when the flow distribution network 10 does not contain restrictive components 70 to 128.7 Torr when the flow distribution network 10 does contain restrictive components 70. Shifting the pressure drop to the restrictive components 70 increases the total system pressure drop. In some implementations, steps may be taken to avoid over-pressuring the gas disconnects when increasing the system pressure drop.

The graph in FIG. 2C also shows that the variable flow element 60 (here a valve) contributes a first portion ($\Delta P_V$) of the total pressure drop $\Delta P_{system}$ and the restrictive component 70 contributes a second portion ($\Delta P_R$) of the total pressure drop $\Delta P_{system}$. Also, there is a relatively small contribution from other components of the flow distribution network 10 as well. When the flow distribution network 10 contains restrictive components 70, the pressure drop is shifted from the variable flow element 60 to the restrictive component 70. In this case, the contribution of the pressure drop from the variable flow element 60 to the total pressure drop in the network 10 drops from 56% to 9%. In embodiments, the ratio of the second portion contributed by the restrictive components 70, on average, to the first portion contributed by the variable flow element 60, on average, is at least a minimum value such as 5:1, 10:1, 15:1, 20:1, etc. In some implementations, the restrictive components 70 may be designed to maintain an inlet pressure at below a maximum value (e.g., 150 torr, 200 torr, 300 torr, 400 torr, 500 torr, 600 torr, etc.).

Figure 2D:
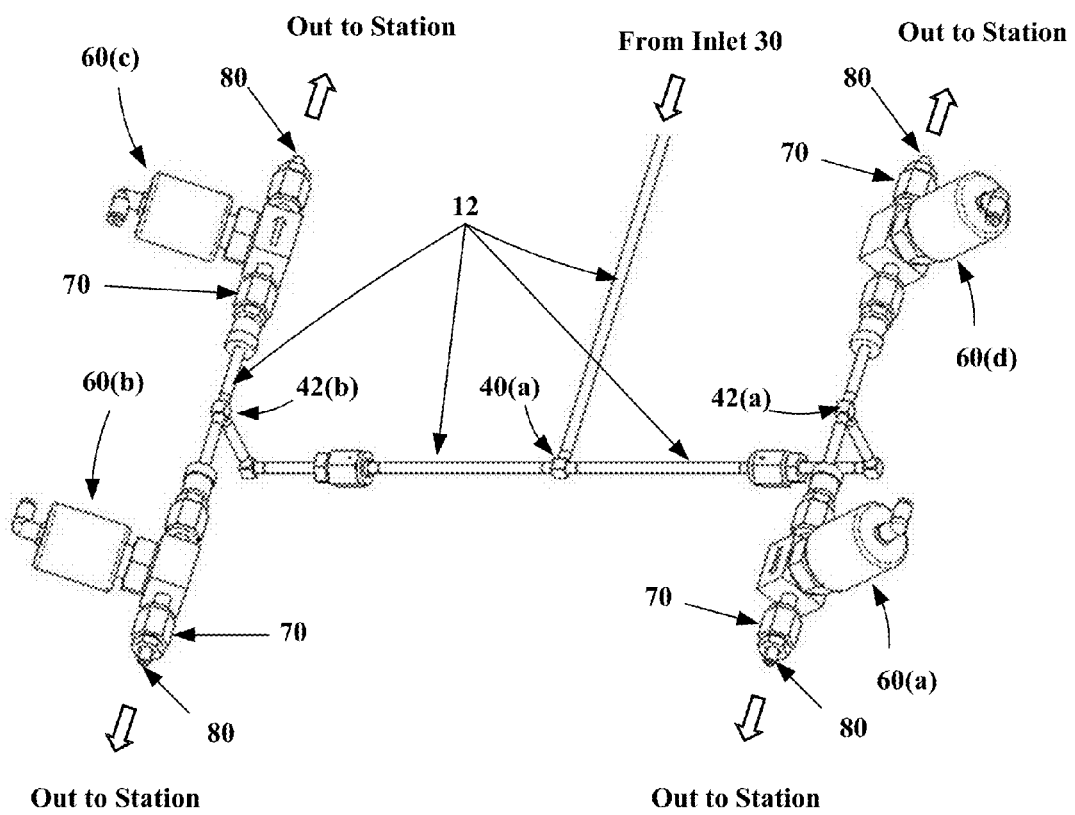
FIG. 2D is a line drawing of components of a flow distribution network with four stations, according to embodiments.

FIG. 2D is a line drawing of components of a flow distribution network 10 with four stations, according to embodiments. The flow distribution network 10 includes a network of flow distribution lines 12 that deliver a process gas out to four stations (not shown). The process gas is provided to the flow distribution network 10 from an inlet (not shown). The depicted flow distribution network 10 has three branch points 40(a), 42(a), and 42(b) at T fittings in the flow distribution lines 12. From the inlet, the gas encounters a first T fitting at a first branch point 40(a), which divides the gas flow into two portions, with one portion providing gas to two stations and the other portion providing gas to two other stations. Each of these lines has two secondary branch points 42(a) and 42(b) at T fittings downstream from the first branch point 40(a). The gas flow is thus divided into four separate branches to corresponding stations.

The flow distribution network 10 depicted in FIG. 2D also includes four variable four variable flow elements 60(a), 60(b), 60(c), and 60(d), depicted here as valves. The flow distribution network 10 also includes four restrictive components 70 downstream from variable flow elements 60(a), 60(b), 60(c), and 60(d). The flow distribution network 10 also includes four outlets 80 to the four stations. The four restrictive components 70 are located at or near the outlets 80. The restrictive components 70 are nominally identical and are designed to shift the bulk of the pressure drop from the more variable flow elements to the less variable restrictive components.

Figure 2E:
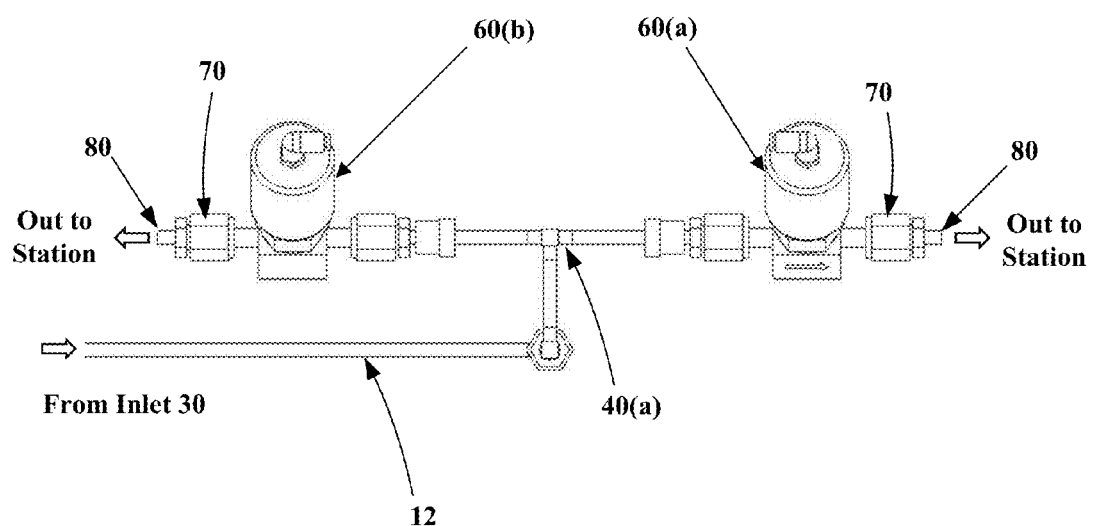
FIG. 2E is a line drawing of components of a flow distribution network with two stations, according to embodiments.

FIG. 2E is a line drawing of components of a flow distribution network 10 including two stations, according to embodiments. The flow distribution network 10 includes a network of flow distribution lines 12 that deliver a process gas out to two stations (not shown). The process gas is provided to the flow distribution network 10 from an inlet (not shown). The flow distribution network 10 has a single branch point 40(a) at a Tee fitting. From the inlet 30, the gas encounters the first Tee at the branch point 40(a), which divides gas flow into two portions through two branches. One branch provides gas to one station and the other branch provides gas to the other station. The flow distribution network 10 also includes two variable four variable flow elements 60(a) and 60(b), depicted here as valves. The flow distribution network 10 also includes two restrictive components 70 downstream from variable flow elements 60(a) and 60(b). The flow distribution network 10 also includes two outlets 80 to the two stations. The two restrictive components 70 are located at or near the outlets 80. The restrictive components 70 are nominally identical and designed to shift the bulk of the pressure drop from the more variable flow elements to the less variable restrictive components.

It should be understood that inventive features disclosed herein are not limited to the flow distribution network 10 such as the depicted in FIGS. 2A, 2B, 2C, and 2D. For example, some embodiments do not utilize separate local station inlets at the individual stations. Additionally, some flow distribution networks employ only a single manifold inlet. Still further, while two stations and four stations are depicted in illustrated networks, the disclosed embodiments are not limited to two and four stations. In fact, any network for delivering a compressible fluid to two or more stations may be employed. Correspondingly, while a network of distribution lines including two branches and four branches are depicted in illustrated networks, the disclosed embodiments may have any number of branches. Also, although the variable flow elements 60 are depicted in illustrated examples as valves any source or of variability or combination of sources of variability can be included. As another example, some embodiments may include one or more controllers for controlling pressure at various components of the network 10 to control the pressure at particular components and/or control the pressure drop through the network 10.

Figure 3A:
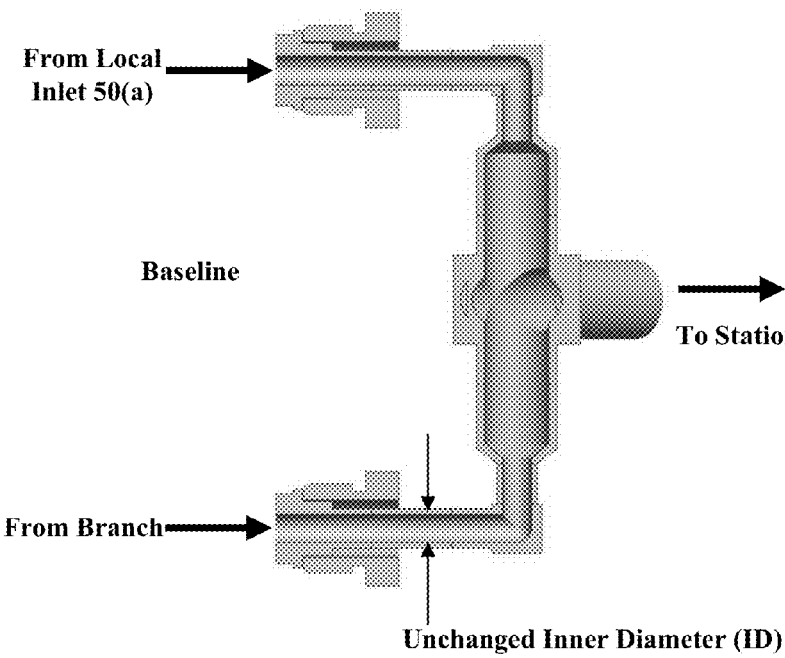
FIGS. 3A and 3B are schematic drawings showing the design change to a portion of the flow distribution network of FIGS. 2A and 2B to include a restrictive component.
Figure 3B:
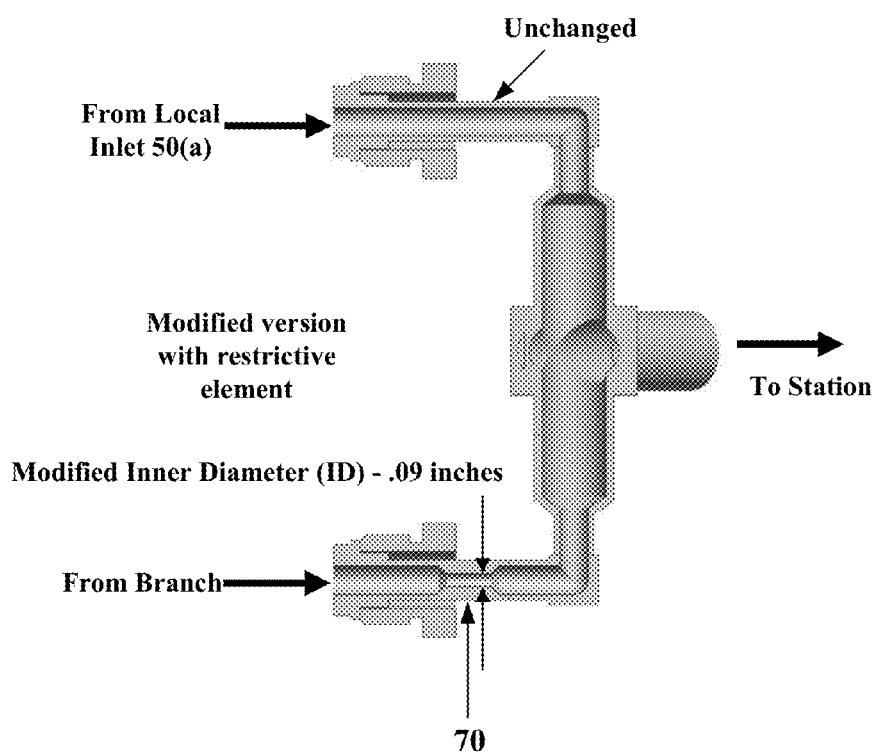

FIGS. 3A and 3B are schematic drawings of a design change in a fluidic element of the flow distribution network 10 as it might appear in FIGS. 2A and 2B. The change introduces a restrictive component 70 between a valve and the outlet 80 to a station 20 in the reactor. FIG. 3A depicts an unchanged (baseline) design of the fluidic element. FIG. 3B depicts a modified version of the fluidic element having a restrictive component 70 in the main flow path of a branch of the flow distribution network 10. The only difference between two elements depicted in FIGS. 3A and 3 is that FIG. 3A contains the restrictive component 70 in a lower conduit feeding into the showerhead (the flow outlet of the distribution network into a reactor station). The upper conduit feeding into the fluidic elements shown in FIGS. 3A and 3B is that associated with the local inlet 50(a) for manifold 3 in FIGS. 2A and 2B. The restrictive component 70 is depicted as a constriction in the inlet located downstream from the valve in a branch. The constriction is represented as having an inner diameter (ID) of about 0.09 inches. The ID of the unchanged lower conduit is about 0.180 inches. In other embodiments, other IDs can be used.

It should be understood that the restrictive component 70 could be used in many different types of flow distribution networks 10, not just those that might have a U-shaped or V-shaped design with a separate local manifold inlet as shown in FIGS. 3A and 3. Also, it should be understood that other designs for restrictive components 70 can be used.

From a design perspective, it may be noted that restrictive components 70 are added downstream from the valves or other variable flow elements 60 in order to reduce the pressure ratios of the variable flow elements 60 and un-choke them. Further, the consistent component (e.g., restrictive component 70) should be the most restrictive fluidic element in each branch of the flow distribution network 10. In other words, most of the pressure drop in any branch occurs mostly in the consistent component. Additionally, the modification of the flow distribution network 10 to balance flow in the legs (branches) and shift the pressure loads away from the variable flow elements 60 should be done in a way that does not cause a significant increase in the overall pressure drop $\Delta P_{system}$ of the flow distribution network 10 and possibly a significant increase in the inlet pressure $P_{inlet}$ of the network 10.

Designing Restrictive Components to Balance Flow

As noted above, it is desirable to have a flow distribution network 10 in which the variability in mass flow rate or deposition rate across the branches of the flow distribution network 10 is quite small, e.g., less than about 1%, 2%, etc. Additionally, it is desirable to meet this goal without unduly increasing the inlet pressure $P_{inlet}$ in the flow distribution network 10.

Figure 4A:
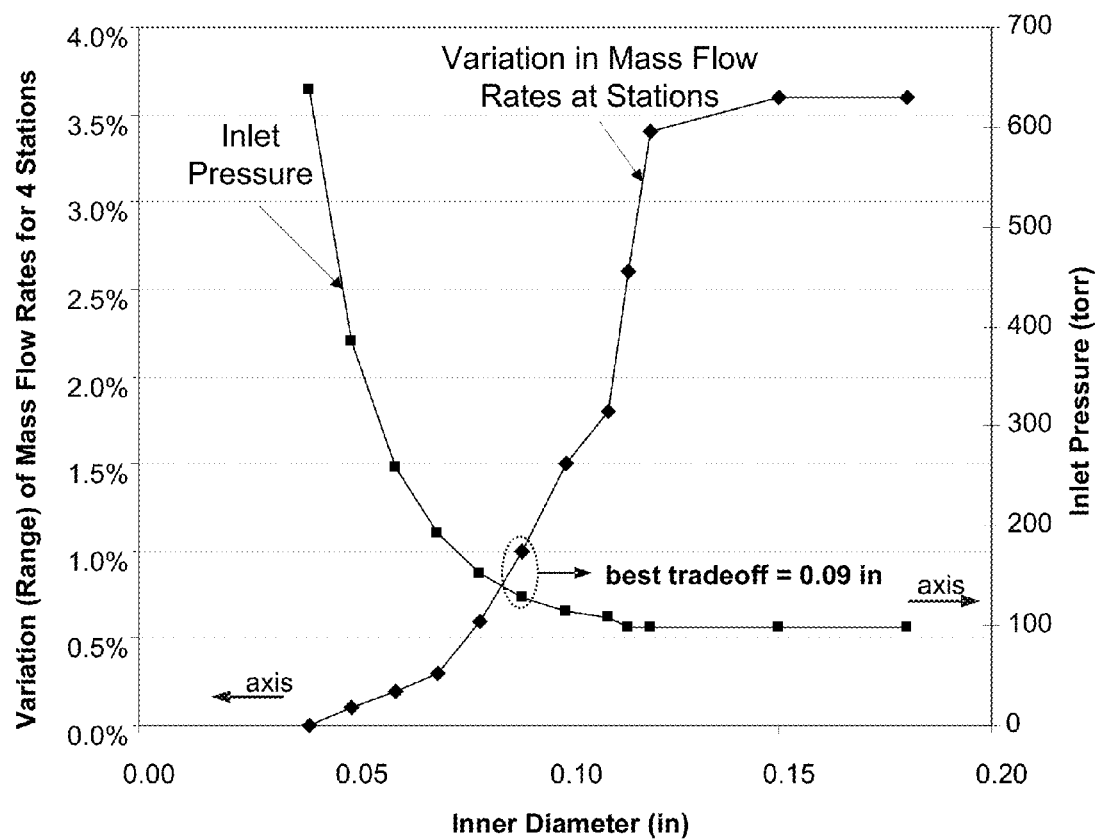
FIG. 4A is a graph illustrating a method of designing a restrictive component to improve flow balance across branches of a flow distribution network, according to embodiments.

FIG. 4A is a graph illustrating a technique of balancing the flow, within a low level of variability, across branches in a flow distribution network 10 by selecting a restrictive component design that balances the flow without unduly increasing the inlet pressure $P_{inlet}$, according to embodiments. This method varies the inner diameter of the restrictive components 70 in the flow distribution network 10 having four stations of FIGS. 2A and 2B. The results are based on the Mathcad® model, as previously described.

The graph in FIG. 4A has two curves. The first curve shows the variation in mass flow rates between the four stations as the inner diameter of the restrictive components 70 is varied from 0.04 inches to 0.18 inches. The second curve shows the inlet pressure of the network as the inner diameter of the restrictive component 70 is varied from 0.04 inches to 0.18 inches. The inner diameter is selected to have the variation in mass flow rate be less than a maximum allowable variation, in this case 1%, and to maintain a relatively low inlet pressure. As shown on the graph, the restrictive component 70 with an inner diameter of 0.090 inches provides a suitably small variation in the variation of mass flow rates provided through each of the branches and at the same time maintains a relatively low inlet pressure in the flow distribution network 10.

Figure 4B:
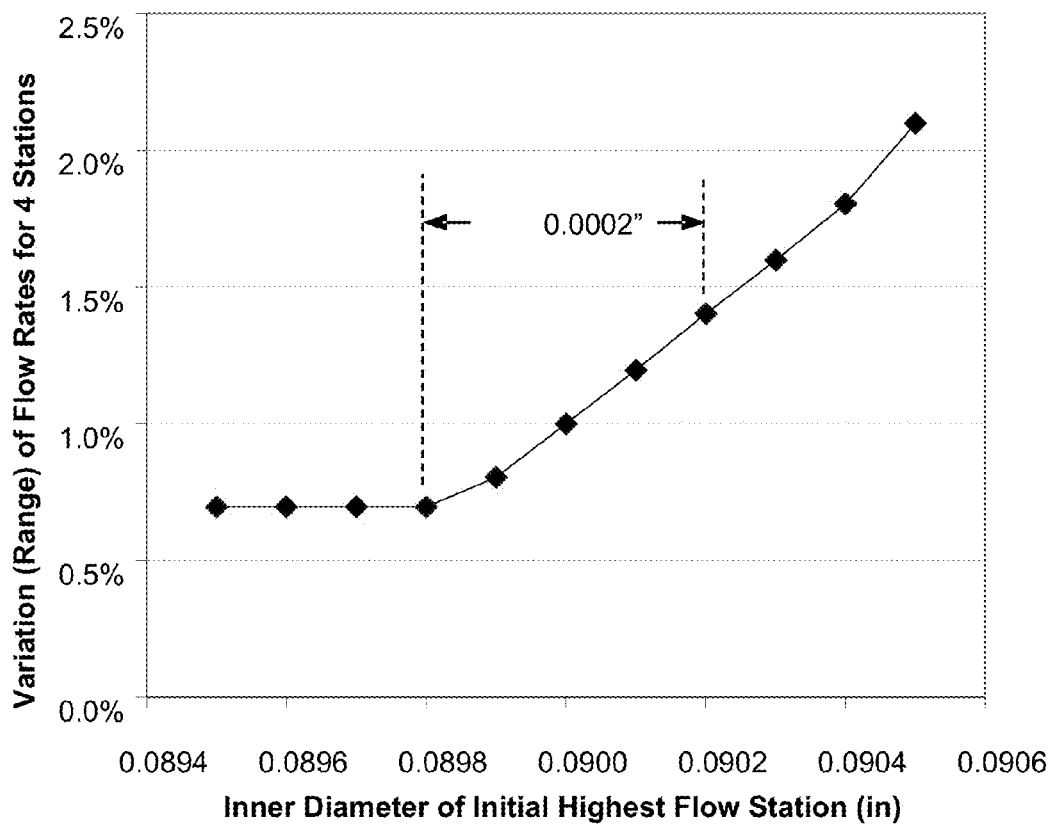
FIG. 4B is a graph of a more detailed view of a portion of the graph in FIG. 4A.

FIG. 4B is a graph of a more detailed view of a portion of the graph in FIG. 4A including a portion of the first curve showing the variation in mass flow rates at the four stations for different values of the inner diameter of the restrictive component 70 from 0.0895 to 0.0905 inches. The graph shows the effect of slight variations in the inner diameter of the restrictive component 70 near 0.09 inches on variations in mass flow rate. The practical tolerance of +−0.0002 inches around the 0.09 inch inner diameter shows the variability of mass flow rates for different restrictive components 70 fabricated within the practical tolerance of +−0.0002 inches. Smaller practical tolerances (e.g., +−0.0001 inches) may be available with, for example, in laser cut components.

Figure 4C:
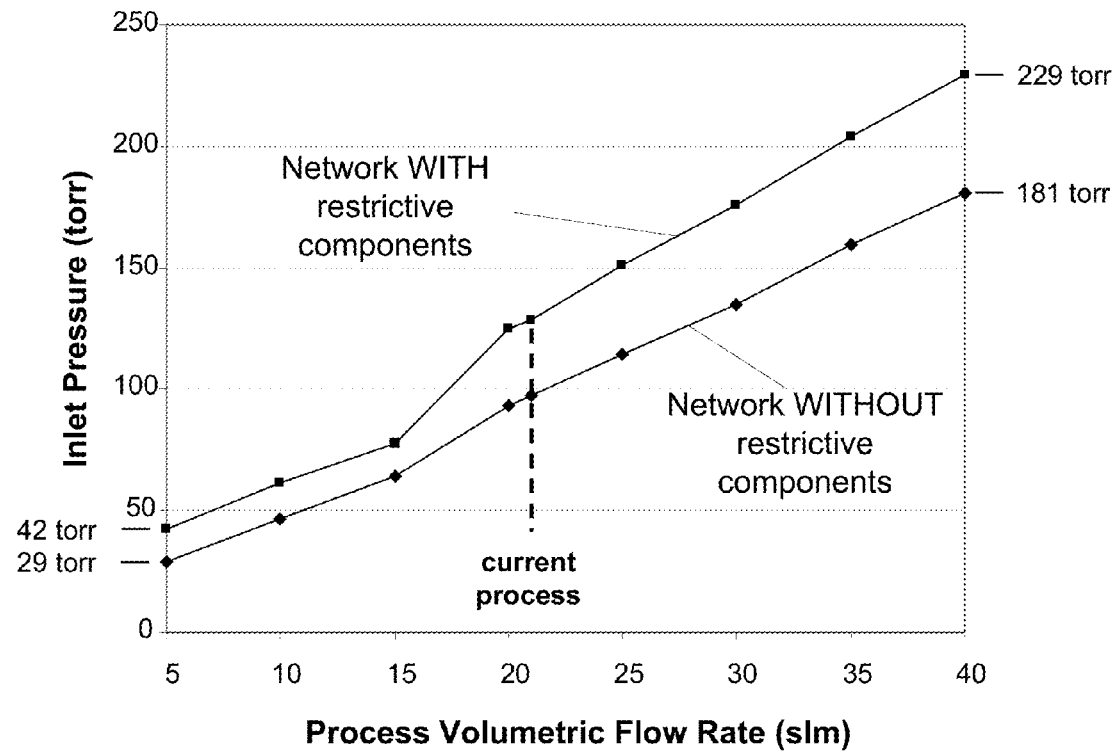
FIG. 4C is a graph plotting the variation in inlet pressure Pinlet for various volumetric flow rates in the flow distribution network of FIGS. 2A and 2B with and without restrictors.

FIG. 4C is a graph showing the variation in inlet pressure $P_{inlet}$ for various volumetric flow rates calculated from the Mathcad® model of the flow distribution network 10 of FIGS. 2A and 2B. The graph includes a first curve that shows how the inlet pressure varies within the distribution network 10 when it does not contain the restrictive components 70. In this case, the inner diameter of the lower conduit between feeding the showerhead is a baseline value of 0.18 inches as shown in FIG. 3A. The graph also includes a second curve that shows how the inlet pressure $P_{inlet}$ varies for different volumetric flow rates within the distribution network 10 when it does contain the restrictive components 70. In this case, the inner diameter is 0.09 inches as shown in FIG. 3B. The comparison is provided for a range of volumetric flow rates in the flow distribution network where slm is the standard liters per minute. As shown for the modeled distribution network, the introduction of restrictive components 70 increases the inlet pressure $P_{inlet}$ by about 10 to 50 Torr. This increase is well within the tolerable range.

Choked Flow

Choked flow in compressible fluids can occur in a fluidic element (e.g., valve, restrictive component, etc.) when the ratio of upstream pressure $P_{in}$ to downstream pressure $P_{out}$ is equal to or greater than a critical pressure ratio P* (defined in Eqn. 1) according to Eqn. 2a. Unchoked flow occurs when this ratio of $P_{in}/P_{out}$ is less than the critical pressure ratio P* based on Eqn. 3a. The flow rate Q for choked flow and unchoked flow is shown in Eqns. 2b and 3b respectively. As shown, the coefficient $C_v$ relates flow rate Q to pressure in the fluidic element.

$$P^* = \left[\frac{k+1}{2}\right]^{\frac{k}{k-1}}, \quad \text{(Eqn. 1)}$$

where
Where:
P*=Critical Pressure Ratio
$k=c_p/c_v$=Ratio of Specific Heats For Fluid
For choked flow in compressible fluids through a fluidic element (choked regime):

$$\frac{P_{in}}{P_{out}} \geq P^* \quad \text{(Eqn. 2a)}$$

$$Q = 0.471 C_v N P_{in} \sqrt{\frac{1}{S_g T_{in}}} \quad \text{(Eqn. 2b)}$$

For unchoked flow in compressible fluids through a fluidic element (unchoked regime):

$$\frac{P_{in}}{P_{out}} < P^* \quad \text{(Eqn. 3a)}$$

$$Q = C_v N P_{in} \left[1 - \frac{2\Delta P}{3 P_{in}}\right] \sqrt{\frac{\Delta P}{P_{in} S_g T_{in}}} \quad \text{(Eqn. 3b)}$$

Where:
$C_v$=Flow Coefficient of Fluidic Element
Q=Flow Rate
N=Constant Based on Units
$P_{in}$=Fluidic element Upstream Pressure
$P_{out}$=Fluidic element Downstream Pressure
$\Delta P$=Total Pressure Drop ($P_{in}-P_{out}$) Through Fluidic element
$S_g$=Specific Gravity of the Fluid
$T_{in}$=Fluidic element Inlet Temperature Flow in a fluidic element, such as a valve, can be choked when its downstream pressure $P_{out}$ drops below its upstream pressure $P_{in}$ by an amount that will increase the ratio of upstream pressure $P_{in}$ to downstream pressure $P_{out}$ to greater than the value of the critical pressure ratio P*, which depends on the fluid properties. When choked, the upstream pressure $P_{in}$ and flow rate Q of the fluidic element becomes independent of the outlet pressure $P_{out}$ according to Eqn. 2b.

To unchoke a fluidic element, the downstream pressure $P_{out}$ can be increased to reduce the velocity of the gas upstream, which increases the density of the gas upstream, and reduce the ratio of upstream pressure $P_{in}$ to downstream pressure $P_{out}$ to below the critical pressure ratio P*. One technique for unchoking the fluidic element is to place a restriction downstream of the fluidic element to shift the pressure load to the restriction to reduce the ratio of $P_{in}/P_{out}$ to less than the critical pressure ratio P*.

Figure 5A:
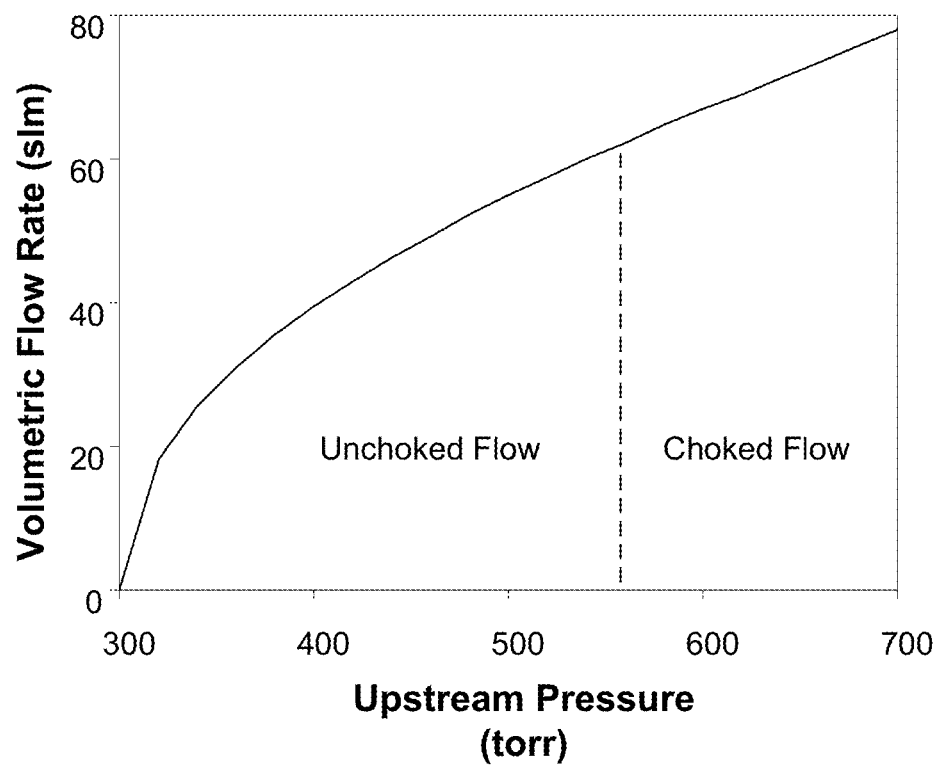
FIG. 5A is a graph plotting volumetric flow rate (slm) versus upstream pressure $P_{in}$ at a fluidic element of embodiments.

FIG. 5A is a graph showing how volumetric flow rate (slm) varies with an increase in upstream pressure $P_{in}$ at a fluidic element, such as a valve. The downstream pressure $P_{out}$ is kept constant at 300 torr and the flow coefficient $C_v$ is 0.55. This graph shows the choked regime and unchoked regime of the fluidic element in terms of upstream pressure $P_{in}$ and volumetric flow rate. As shown, as the inlet pressure $P_{in}$ goes above the downstream pressure $P_{out}$ by an amount that increases the ratio of the upstream pressure to downstream pressure above the critical pressure ratio P*, the flow at the fluidic element becomes choked.

Figure 5B:
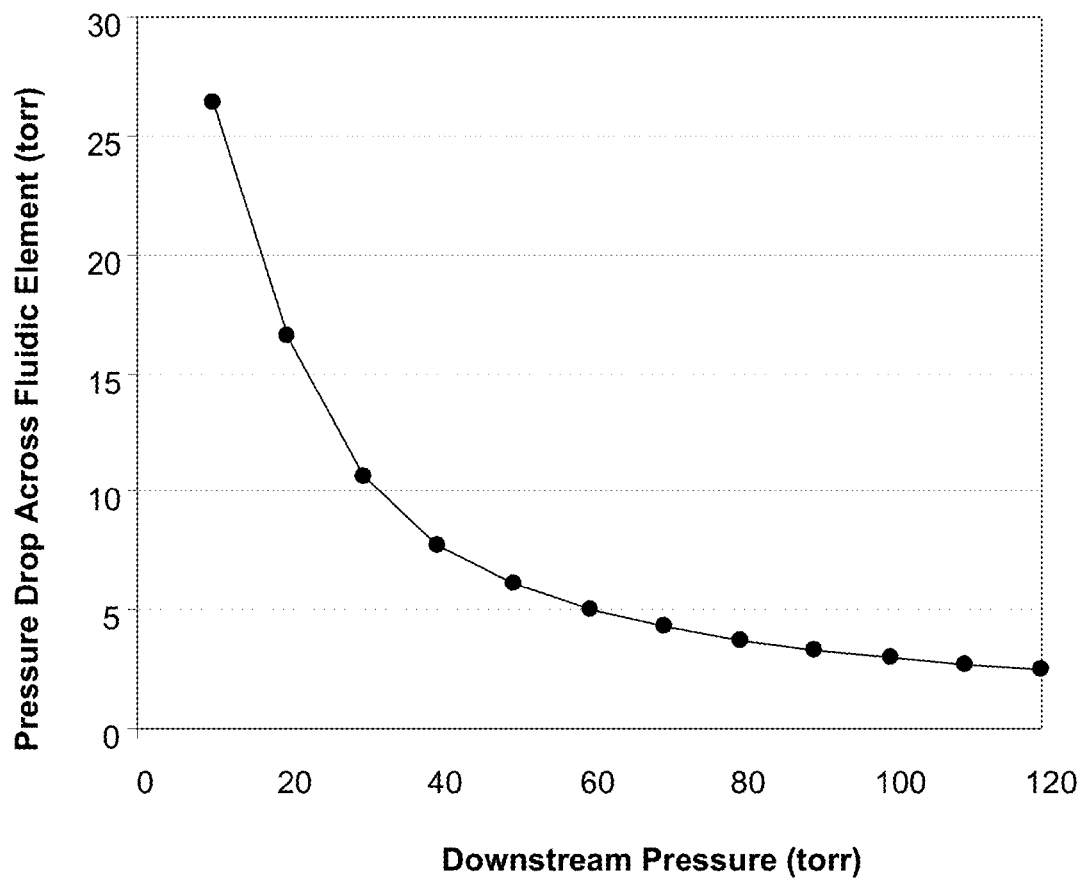
FIG. 5B is a graph plotting pressure drop versus downstream pressure in the fluid element of FIG. 5A.

FIG. 5B is a graph showing that by increasing the downstream pressure $P_{out}$ in a fluidic element (e.g., valve outlet pressure) one can reduce the velocity through the fluidic element and thereby reduce the pressure drop through the fluidic element. The downstream pressure $P_{out}$ is increased by introducing a restrictive component 70 downstream from the valve outlet.

Figure 5C:
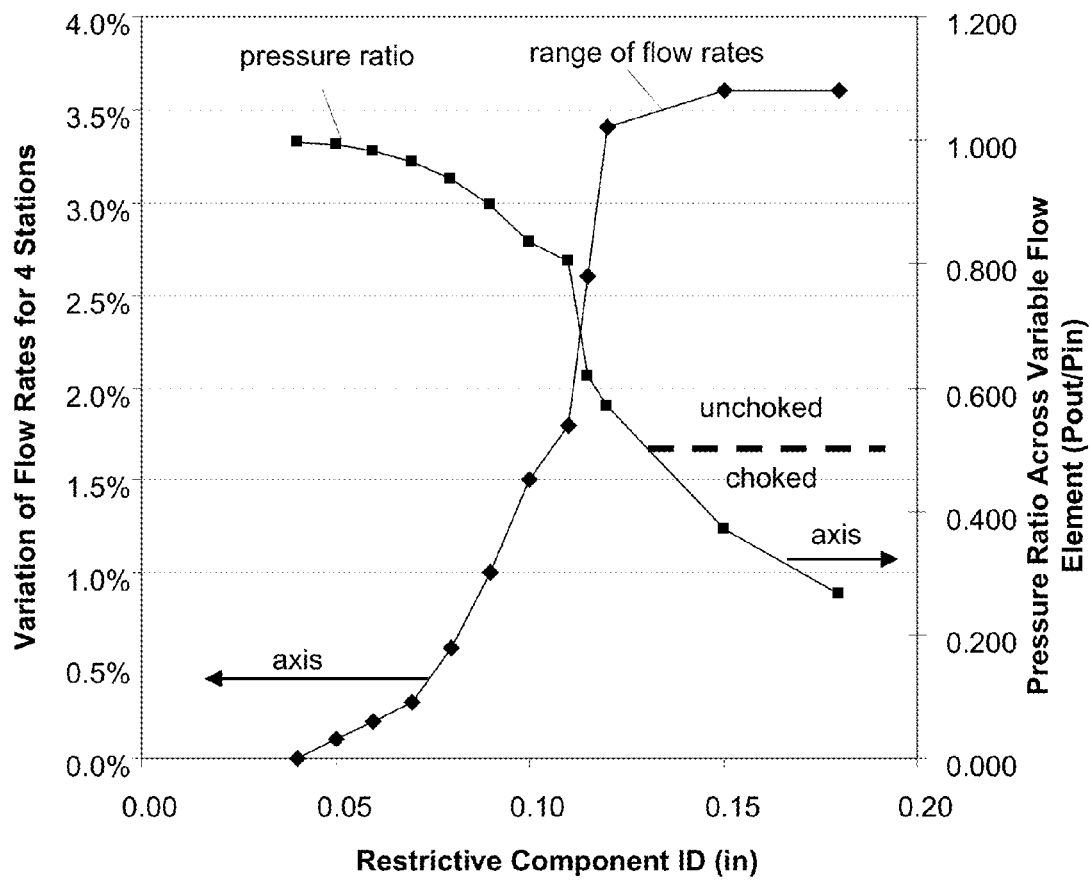
FIG. 5C is a graph showing the relationship of variability in flow rates and pressure ratio at the variable flow elements to the level or restriction in the restrictive components of the flow distribution network in FIGS. 2A and 2B.

FIG. 5C is a graph illustrating flow balancing in flow distribution networks 10 (e.g., network shown in FIGS. 2A and 2B) having four stations 20 by introducing restrictive components 70, according to embodiments. The graph has a first curve showing how the ratio $P_{out}/P_{in}$ across a variable flow element 60 changes for various restrictions based on inner diameter of the restrictive component 70. The graph has a second curve showing how the variation in flow rates across stations changes for various restrictions based on inner diameter of the restrictive component 70. The choked and unchoked regimes are shown in terms of the $P_{out}/P_{in}$ ratio. The variable flow elements 60 are in the choked region when the inner diameter downstream of the variable flow elements 60 is more than about 0.130 inches. In this region, the $P_{out}$ of the variable flow elements 60 is less than 50% of the $P_{in}$.

In the unchoked region, increasing the inner diameter of the restrictive components 70 can improve the variation in flow rates to the four stations. In the choked region, when the inner diameter is more than 0.130 inches, the second curve is relatively flat and the variation in flow rates is less related to changes in inner diameter of the restrictive components 70. That is, the graph shows that the change in variation in flow rates for changes in inner diameter is relatively larger when the variable flow elements 60 are in the unchoked regime than when the variable flow elements 60 are in the choked regime. Further, by shifting the pressure load to the restrictive component 70, which exhibits less variability than the valve, one increases the overall consistency or accuracy of the flow rate in each of the branches of the flow distribution network.

The flow distribution networks 10 described herein can unchoke flow through the variable flow elements 60 or other fluidic elements. These flow distribution networks 10 unchoke the flow by placing restrictive components 70 downstream from each of the choked elements to shift pressure drop away from the choked element to the restrictive component 70. The pressure drop is shifted by such an amount that will reduce the ratio of upstream pressure $P_{in}$ to downstream pressure $P_{out}$ in the choked element to less than the critical pressure ratio P* defined in Eqn. 1. For example, the restrictive components 70 may be designed to produce, on average, a pressure drop that is at least a minimum pressure drop required to unchoke the variable flow element 60 upstream from the restrictive component. This minimum pressure drop required to unchoke the variable flow element 60 can be determined from Eqn. 1. Unchoking the variable flow elements 60 in the flow distribution networks 10 can reduce the overall variation in flow rates from branch to branch and thus improve flow balancing. As a result of load shifting, the restrictive components 70 can become choked. Since restrictive components 70 have relatively constant values of $C_v$, choking these components causes relatively small variation in flow rates as compared with variations in flow rates caused by the previously choked variable flow elements 60 and thus flow balancing is overall improved.

Figure 6:
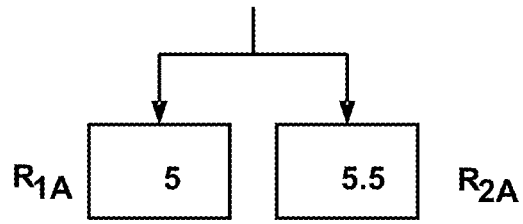
FIG. 6 is a diagram of an electrical circuit analogy to flow balancing in the flow distribution network of embodiments.
Figure 6:
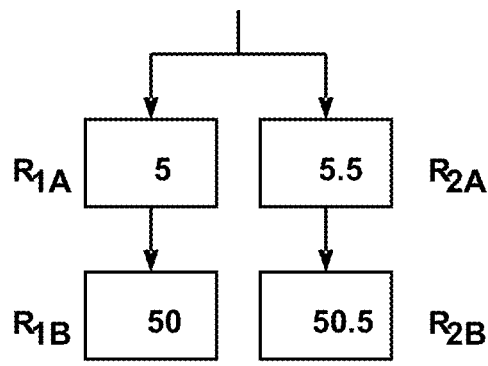

FIG. 6 is a diagram of an electrical circuit analogy to flow balancing in the flow distribution network 10 of embodiments. In the analogy, a resistor represents a fluidic element in which the voltage across a resistor corresponds to the pressure drop across the fluidic element and the current through the resistor corresponds to the mass flow through the fluidic element. The resistance in a series circuit is $R_{total}=R_1$ and $R_2$. If two legs in a circuit are unbalanced by an inconsistent component, adding a ballast of higher resistance and consistency improves balancing. As illustrated, the addition of a large resistor on each leg of an electrical circuit reduces the "error" in the ratio of total resistance in the individual legs of the circuit. By analogy, the introduction of a fluidic element that provides a large pressure drop (i.e., a large resistance to fluid flow) similarly reduces the "error" in the ratio of the flow rates through the branches of the fluidic network. Therefore, the introduction of these restrictive fluidic elements improves the overall balancing of the network.

Controlling the Flow Distribution Network

The flow distribution networks 10 as disclosed herein may be employed in many different types of processing tool. For example, the multi-station reactor described in U.S. patent application Ser. No. 12/970,846, previously incorporated by reference, may be outfitted with a flow distribution network 10 as described herein.

In some embodiments, a system controller (which may include one or more physical or logical controllers) controls some or all of the operations of a process tool. For example, the system controller can control the pressure at the inlet or inlets of a fluid distribution network 10 of embodiments. The system controller executes system control software executed on a processor. The system control software may include instructions for controlling the timing, mixture of gases, inlet pressure, chamber and/or station pressure, chamber and/or station temperature, wafer temperature, target power levels, RF power levels, substrate pedestal, chuck and/or susceptor position, and other parameters of a particular process performed by the process tool. System control software may be configured in any suitable way. For example, various process tool component subroutines or control objects may be written to control operation of the process tool components necessary to carry out various process tool processes. System control software may be coded in any suitable computer readable programming language.

In embodiments, the system controller may control the inlet(s) pressure, the pressure at one or more outlets, and/or the system pressure drop on average across the fluid distribution network 10. The system controller may be in communication with one or more components of the fluid distribution network 10 such as, for example, the inlet(s), outlets, stations, etc. The system controller may send signals to the one or more components to control the pressure.

In some embodiments, system control software includes input/output control (IOC) sequencing instructions for controlling the various parameters described above. For example, each phase of a CFD process may include one or more instructions for execution by the system controller. The instructions for setting process conditions for a CFD process phase may be included in a corresponding CFD recipe phase. In some embodiments, the CFD recipe phases may be sequentially arranged, so that all instructions for a CFD process phase are executed concurrently with that process phase.

Other computer software and/or programs may be employed in some embodiments. Examples of programs or sections of programs for this purpose include a substrate positioning program, a process gas control program, a pressure control program, a heater control program, and a plasma control program.

A substrate positioning program may include program code for process tool components that are used to load the substrate onto a pedestal and to control the spacing between the substrate and other parts of the process tool.

A process gas control program may include code for controlling gas composition and flow rates and optionally for flowing gas into one or more process stations prior to deposition in order to stabilize the pressure in the process station. A pressure control program may include code for controlling the pressure in the process station 20 by regulating, for example, a throttle valve in the exhaust system of the process station, a gas flow into the process station, etc. For example, the pressure control program can include code for: 1) controlling the pressure at inlet(s) 30, 2) controlling the pressure at the outlets 80, 3) controlling the pressure at the stations 20, and/or 4) controlling the total system pressure drop on average across the branches of the flow distribution network 10.

A heater control program may include code for controlling the current to a heating unit that is used to heat the substrate. Alternatively, the heater control program may control delivery of a heat transfer gas (such as helium) to the substrate.

A plasma control program may include code for setting RF power levels applied to the process electrodes in one or more process stations.

In some embodiments, there may be a user interface associated with the system controller. The user interface may include a display screen, graphical software displays of the apparatus and/or process conditions, and user input devices such as pointing devices, keyboards, touch screens, microphones, etc.

In some embodiments, parameters adjusted by the system controller may relate to process conditions. Non-limiting examples include process gas composition and flow rates, temperature, pressure, plasma conditions (such as RF bias power levels), pressure, temperature, etc. These parameters may be provided to the user in the form of a recipe, which may be entered utilizing the user interface.

Signals for monitoring the process may be provided by analog and/or digital input connections of the system controller from various process tool sensors. The signals for controlling the process may be output on the analog and digital output connections of the process tool. Non-limiting examples of process tool sensors that may be monitored include mass flow controllers, pressure sensors (such as manometers), thermocouples, etc. Appropriately programmed feedback and control algorithms may be used with data from these sensors to maintain process conditions.

The system controller may provide program instructions for implementing the above-described deposition processes. The program instructions may control a variety of process parameters, such as DC power level, RF bias power level, pressure, temperature, etc. The instructions may control the parameters to operate in-situ deposition of film stacks according to various embodiments described herein.

The apparatus/process described hereinabove may be used in conjunction with lithographic patterning tools or processes, for example, for the fabrication or manufacture of semiconductor devices, displays, LEDs, photovoltaic panels and the like. Typically, though not necessarily, such tools/processes will be used or conducted together in a common fabrication facility. Lithographic patterning of a film typically includes some or all of the following operations, each operation enabled with a number of possible tools: (1) application of photoresist on a workpiece, i.e., substrate, using a spin-on or spray-on tool; (2) curing of photoresist using a hot plate or furnace or UV curing tool; (3) exposing the photoresist to visible or UV or x-ray light with a tool such as a wafer stepper; (4) developing the resist so as to selectively remove resist and thereby pattern it using a tool such as a wet bench; (5) transferring the resist pattern into an underlying film or workpiece by using a dry or plasma-assisted etching tool; and (6) removing the resist using a tool such as an RF or microwave plasma resist stripper.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

What is claimed is:

1. A flow distribution network for supplying a process gas to two or more destinations, the flow distribution network comprising:
    an inlet for receiving the process gas;
    a network of flow distribution lines for carrying the process gas comprising a branch point downstream from the inlet and two or more branches downstream from the branch point, wherein each branch has an outlet for supplying process gas to a corresponding destination;
    a variable flow element in each branch having a Cv value that varies by at least about 2% from element to element across the branches; and
    a restrictive component downstream from the variable flow element in each branch, wherein the restrictive components are nominally identical,
    wherein the flow of the process gas produces a system pressure drop, from the inlet to the outlets, across the flow distribution network is at least as great as the pressure at the outlets.

2. The flow distribution network of claim 1, wherein the variable flow elements operate in the unchoked flow regime.

3. The flow distribution network of claim 1, wherein the restrictive components produce at least about 3% of the system pressure drop on average across the restrictive components.

4. The flow distribution network of claim 1, wherein the restrictive components produce at least about 50% of the system pressure drop on average across the restrictive components.

5. The flow distribution network of claim 1, wherein the restrictive components produce between 10% and 80% of the system pressure drop on average across the restrictive components.

6. The flow distribution network of claim 1, wherein the variable flow elements produce at most about 10% of the system pressure drop in the flow distribution network on average across the variable flow elements.

7. The flow distribution network of claim 1, wherein the variable flow elements produce at most about 5% of the system pressure drop in the flow distribution network on average across the variable flow elements.

8. The flow distribution network of claim 1, wherein the variable flow elements produce, on average, a first portion of the system pressure drop in the flow distribution network and the restrictive components produce, on average, a second portion of the system pressure drop in the flow distribution network, and wherein a ratio of the second portion to the first portion is between about 5:1 to about 20:1.

9. The flow distribution network of claim 1, wherein the variable flow elements produces a mass flow rate that vary by at least about 2% on average from element to element across the branches when each element experiences substantially the same pressure drop.

10. The flow distribution network of claim 1, wherein the restrictive components in the branches have $C_v$ values that on average vary by 1% or less from component to component across the branches.

11. The flow distribution network of claim 1, wherein the restrictive components in the branches have $C_v$ values that on average vary by 4% or less from component to component across the branches.

12. The flow distribution network of claim 1, wherein the variable flow element in each branch includes a valve.

13. The flow distribution network of claim 1, wherein the restrictive component is a constriction in an associated flow distribution line downstream of the variable flow element.

14. The flow distribution network of claim 1, wherein the restrictive components provide process gas at a nominally uniform mass flow rate to respective outlets supplying the destinations.

15. The flow distribution network of claim 14, wherein the nominally uniform mass flow rate varies by less than about 1% between outlets.

16. The flow distribution network of claim 14, wherein the nominally uniform mass flow rate varies by less than about 2% between outlets.

17. The flow distribution network of claim 1, further comprising a controller in communication with the inlet and the outlets to control the system pressure drop.

18. The flow distribution network of claim 1, wherein the inlet pressure is less than about a 200 torr.

19. A method of balancing flow to two or more destinations, the method comprising:
   receiving process gas at an inlet;
   carrying process gas through a network of flow distribution lines comprising a branch point downstream from the inlet and two or more branches downstream from the branch point, each branch having a variable flow element with a $C_v$ value that varies by at least about 2% from element to element across the branches;
   supplying process gas through an outlet in each branch to a corresponding destination;
   locating a restrictive component downstream from each variable flow element in each branch, wherein the restrictive components are nominally identical across the branches; and
   producing a system pressure drop, from inlet to the outlets, across the flow distribution network is at least as great as the pressure drop at the outlets.

20. The method claim 19, further comprising operating the variable flow elements in an unchoked flow regime.

21. The method of claim 19, wherein producing a system pressure drop comprises producing, by the restrictive components, between 10% and 80% of the system pressure drop on average across the restrictive components.

22. The method of claim 19, wherein producing the system pressure drop comprises producing, by the variable flow elements, at most about 10% of the system pressure drop in the flow distribution network on average across the variable flow elements.

23. The method of claim 19, wherein producing the system pressure drop comprises:
   producing, by the variable flow elements on average, a first portion of the system pressure drop; and
   producing, by the restrictive components on average, a second portion of the system pressure drop, wherein a ratio of the second portion to the first portion is between about 5:1 to about 20:1.

24. The method of claim 19, wherein the restrictive components in the branches have $C_v$ values that on average vary by 1% or less from component to component across the branches.

25. The method of claim 19, further comprising providing, by the restrictive components, process gas at a nominally uniform mass flow rate to respective outlets supplying destinations.

26. The method of claim 25, wherein the nominally uniform mass flow rate varies by less than about 1% between outlets.

27. The method of claim 19, wherein producing the system pressure drop, comprises controlling the system pressure drop by a controller in communication with the inlet and the outlets.

28. The flow distribution network of claim 1, wherein the two or more destinations are in a single reactor.

29. The flow distribution network of claim 1, wherein the two or more destinations are in multiple reactors.

30. The flow distribution network of claim 1, where the pressure at the outlet of each branch is about 7 torr or less.

31. The flow distribution network of claim 1, where the pressure at the outlet of each branch is about 5 torr.

32. The method of claim 19, wherein the two or more destinations are in a single reactor.

33. The method of claim 19, wherein the two or more destinations are in multiple reactors.

34. The method of claim 19, where the pressure at the outlet of each branch is about 7 torr or less.

35. The method of claim 19, where the pressure at the outlet of each branch is about 5 torr.

* * * * *